United States Patent
Mehr et al.

(10) Patent No.: US 8,214,438 B2
(45) Date of Patent: Jul. 3, 2012

(54) (MORE) ADVANCED SPAM DETECTION FEATURES

(75) Inventors: John D. Mehr, Seattle, WA (US); Nathan D. Howell, Seattle, WA (US); Micah C. Rupersburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1685 days.

(21) Appl. No.: 10/790,574

(22) Filed: Mar. 1, 2004

(65) Prior Publication Data

US 2005/0193073 A1 Sep. 1, 2005

(51) Int. Cl.
*G06F 15/16* (2006.01)
(52) U.S. Cl. ........................................................ 709/206
(58) Field of Classification Search .................. 709/206
See application file for complete search history.

(56) References Cited

U.S. PATENT DOCUMENTS

| | | |
|---|---|---|
| 5,377,354 A | 12/1994 | Scannell et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 6,003,027 A | 12/1999 | Prager |
| 6,023,723 A | 2/2000 | McCormick et al. |
| 6,041,324 A | 3/2000 | Earl et al. |
| 6,047,242 A | 4/2000 | Benson |
| 6,052,709 A | 4/2000 | Paul |
| 6,074,942 A | 6/2000 | Stockwell et al. |
| 6,101,531 A | 8/2000 | Eggleston et al. |
| 6,112,227 A | 8/2000 | Heiner |
| 6,161,130 A | 12/2000 | Horvitz et al. |
| 6,167,434 A | 12/2000 | Pang |

(Continued)

FOREIGN PATENT DOCUMENTS

CA 2389472 A1 12/2003

(Continued)

OTHER PUBLICATIONS

"SpamAssassin—Tests Performed". SpamAssassin. Archived on Jun. 2, 2003, by the Internet Archive: <http://web.archive.org/web/20030602100550/http://www.au.spamassassin.org/tests.html>.*

(Continued)

*Primary Examiner* — Christopher Biagini
(74) *Attorney, Agent, or Firm* — Shook, Hardy & Bacon L.L.P.

(57) ABSTRACT

The present invention involves a system and method that facilitate extracting data from messages for spam filtering. The extracted data can be in the form of features, which can be employed in connection with machine learning systems to build improved filters. Data associated with the subject line, timestamps, and the message body can be extracted and employed to generate one or more features. In particular, subject lines and message bodies can be examined for consecutive, repeating characters, blobs, the association or distance between such characters, blobs and non-blob portions of the message. The values or counts obtained can be broken down into one or more ranges corresponding to a degree of spaminess. Presence and type of attachments to messages, percentage of non-white-space and non-numeric characters of a message, and determining message delivery times can be used to identify spam. A time-based delta can be computed to facilitate determining the delivery time.

16 Claims, 9 Drawing Sheets

U.S. PATENT DOCUMENTS

| | | | |
|---|---|---|---|
| 6,192,360 B1 | 2/2001 | Dumais et al. | |
| 6,199,102 B1 | 3/2001 | Cobb | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,327,617 B1 | 12/2001 | Fawcett | |
| 6,330,590 B1 | 12/2001 | Cotten | |
| 6,351,740 B1 | 2/2002 | Rabinowitz | |
| 6,370,526 B1 | 4/2002 | Agrawal et al. | |
| 6,377,957 B1 | 4/2002 | Jeyaraman | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,434,600 B2 | 8/2002 | Waite et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,633,855 B1 | 10/2003 | Auvenshine | |
| 6,643,686 B1 | 11/2003 | Hall | |
| 6,684,201 B1 | 1/2004 | Brill | |
| 6,691,156 B1 | 2/2004 | Drummond et al. | |
| 6,701,440 B1 | 3/2004 | Kim et al. | |
| 6,728,690 B1 | 4/2004 | Meek et al. | |
| 6,732,149 B1 * | 5/2004 | Kephart | 709/206 |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,842,773 B1 | 1/2005 | Ralston et al. | |
| 6,915,334 B1 | 7/2005 | Hall | |
| 6,928,465 B2 | 8/2005 | Earnest | |
| 6,971,023 B1 | 11/2005 | Makinson et al. | |
| 7,003,555 B1 | 2/2006 | Jungck | |
| 7,016,939 B1 * | 3/2006 | Rothwell et al. | 709/206 |
| 7,051,077 B2 | 5/2006 | Lin | |
| 7,117,358 B2 | 10/2006 | Bandini et al. | |
| 7,146,402 B2 | 12/2006 | Kucherawy | |
| 7,155,484 B2 | 12/2006 | Malik | |
| 7,206,814 B2 | 4/2007 | Kirsch | |
| 7,219,148 B2 | 5/2007 | Rounthwaite et al. | |
| 7,249,162 B2 | 7/2007 | Rounthwaite et al. | |
| 7,263,607 B2 | 8/2007 | Ingerman et al. | |
| 7,320,020 B2 | 1/2008 | Chadwick et al. | |
| 7,359,941 B2 | 4/2008 | Doan et al. | |
| 7,366,761 B2 | 4/2008 | Murray et al. | |
| 7,562,304 B2 | 7/2009 | Dixon et al. | |
| 2001/0046307 A1 | 11/2001 | Wong | |
| 2002/0016956 A1 | 2/2002 | Fawcett | |
| 2002/0049817 A1 | 4/2002 | Drory et al. | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0129111 A1 | 9/2002 | Cooper | |
| 2002/0184315 A1 | 12/2002 | Earnest | |
| 2002/0199095 A1 | 12/2002 | Bandini et al. | |
| 2003/0007397 A1 | 1/2003 | Kobayashi et al. | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0158905 A1 | 8/2003 | Petry et al. | |
| 2003/0167311 A1 | 9/2003 | Kirsch | |
| 2003/0182421 A1 | 9/2003 | Faybishenko et al. | |
| 2003/0191969 A1 | 10/2003 | Katsikas | |
| 2003/0200541 A1 | 10/2003 | Cheng et al. | |
| 2003/0203732 A1 | 10/2003 | Eerola | |
| 2003/0204569 A1 | 10/2003 | Andrews et al. | |
| 2003/0220771 A1 | 11/2003 | Vaidyanathan et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0019650 A1 | 1/2004 | Auvenshine | |
| 2004/0054498 A1 * | 3/2004 | Shipp | 702/182 |
| 2004/0054887 A1 | 3/2004 | Paulsen et al. | |
| 2004/0064515 A1 | 4/2004 | Hockey | |
| 2004/0068543 A1 * | 4/2004 | Seifert | 709/206 |
| 2004/0073617 A1 | 4/2004 | Milliken et al. | |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177110 A1 | 9/2004 | Rounthwaite et al. | |
| 2004/0177120 A1 | 9/2004 | Kirsch | |
| 2004/0193691 A1 | 9/2004 | Chang | |
| 2004/0199594 A1 | 10/2004 | Radatti et al. | |
| 2004/0210640 A1 | 10/2004 | Chadwick et al. | |
| 2004/0215977 A1 | 10/2004 | Goodman et al. | |
| 2004/0255122 A1 | 12/2004 | Ingerman et al. | |
| 2005/0015455 A1 | 1/2005 | Liu | |
| 2005/0015626 A1 | 1/2005 | Chasin | |
| 2005/0022008 A1 | 1/2005 | Goodman et al. | |
| 2005/0052998 A1 | 3/2005 | Oliver et al. | |
| 2005/0060643 A1 * | 3/2005 | Glass et al. | 715/501.1 |
| 2005/0076084 A1 | 4/2005 | Loughmiller et al. | |
| 2005/0081059 A1 | 4/2005 | Bandini et al. | |
| 2005/0091321 A1 | 4/2005 | Daniell et al. | |
| 2005/0102366 A1 * | 5/2005 | Kirsch | 709/207 |
| 2005/0114452 A1 | 5/2005 | Prakash | |
| 2005/0120019 A1 | 6/2005 | Rigoutsos et al. | |
| 2005/0160148 A1 | 7/2005 | Yu | |
| 2005/0165895 A1 | 7/2005 | Rajan et al. | |
| 2005/0193073 A1 | 9/2005 | Mehr et al. | |
| 2005/0198159 A1 | 9/2005 | Kirsch | |
| 2005/0204159 A1 | 9/2005 | Davis et al. | |
| 2005/0228899 A1 | 10/2005 | Wendkos et al. | |
| 2006/0015942 A1 | 1/2006 | Judge et al. | |
| 2006/0031359 A1 | 2/2006 | Clegg et al. | |
| 2006/0036701 A1 | 2/2006 | Bulfer et al. | |
| 2006/0059238 A1 | 3/2006 | Slater et al. | |
| 2006/0168017 A1 | 7/2006 | Stern et al. | |
| 2006/0168024 A1 | 7/2006 | Mehr et al. | |
| 2006/0168041 A1 | 7/2006 | Mishra et al. | |
| 2006/0179113 A1 | 8/2006 | Buckingham et al. | |
| 2006/0212931 A1 | 9/2006 | Shull et al. | |
| 2006/0253458 A1 | 11/2006 | Dixon et al. | |
| 2007/0005702 A1 | 1/2007 | Tokuda et al. | |
| 2007/0073660 A1 | 3/2007 | Quinlan | |
| 2007/0101423 A1 | 5/2007 | Oliver et al. | |
| 2007/0220607 A1 | 9/2007 | Sprosts et al. | |
| 2007/0226297 A1 | 9/2007 | Dayan et al. | |
| 2007/0250644 A1 | 10/2007 | Lund et al. | |
| 2008/0104186 A1 | 5/2008 | Wieneke et al. | |
| 2008/0140781 A1 | 6/2008 | Bocharov et al. | |
| 2008/0168145 A1 * | 7/2008 | Wilson | 709/206 |

FOREIGN PATENT DOCUMENTS

| | | |
|---|---|---|
| EP | 413 537 | 2/1991 |
| EP | 720 333 | 7/1996 |
| EP | 1376427 | 3/2003 |
| EP | 1376427 A2 | 1/2004 |
| EP | 1376427 A3 | 1/2004 |
| WO | WO 96/35994 | 11/1996 |
| WO | 9967731 | 12/1999 |
| WO | WO 02/071286 | 9/2002 |
| WO | WO 02071286 A2 * | 9/2002 |
| WO | 03054764 | 7/2003 |
| WO | WO 2004/059605 | 7/2004 |
| WO | 2004081734 A2 | 9/2004 |

OTHER PUBLICATIONS

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.
Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.
Graham, P., The Future of Spam, Computer Security Journal, CSI Computer Security Institute, vol. 19, No. 1, Jan. 2003, pp. 1-5.
Graham, P., A Plan for Spam, Online!, Aug. 2002, XP002273602, http://www.paulgraham.com/spam.html, retrieved on Mar. 12, 2004.
European Search Report dated Apr. 6, 2006 and mailed Apr. 6, 2006 for EP 04102242, 3 pages.
Graham. "The Future of SPAM" (2003) Computer Journal, CSI Computer Security Institute, vol. 19, No. 1, 6 pages.
European Search Report, EP31087TE900, mailed Nov. 11, 2004.
J. Byrne, My Spamblock, Google, Jan. 19, 1997, 2 pages.
D. F. Skoll, How to Make Sure a Human is Sending You Mail, Google, Nov. 17, 1996, 2 pages.
L. M. Bowman, Hotmail Spam Filters Block Outgoing E-Mail, CNET NEWS.COM, Jan. 18, 2001, 3 pages.
U.S. Appl. No. 10/208,150, filed Jul. 29, 2002, Andaker.
U.S. Appl. No. 09/893,941, filed Jun. 28, 2001, Horvitz.
U.S. Appl. No. 10/278,591, filed Oct. 23, 2002, Heckerman.
U.S. Appl. No. 10/180,565, filed Jun. 26, 2002, Goodman.
U.S. Appl. No. 09/497,992, filed Feb. 4, 2000, Maller.
U.S. Appl. No. 10/291,260, filed Nov. 8, 2002, Burrows.
Breiman, Friedman, Olshen, and Stone. "Classification and Regression Trees." Wadsworth & Brooks, Monterey, CA (1984).
Quinlan. "c4.5: Programs for Machine Learning." Morgan Kaufmann, San Francisco, CA (1993).
Hayes, Brian."Spam, Spam, Spam, Lovely Spam." American Scientist Online, Jun. 30, 2003. pp. 1-6. vol. 91.
Partial European Search Report, EP05100847, mailed Jun. 21, 2005, 5 pages.
European Search Report, dated Jun. 9, 2005, mailed Aug. 22, 2005 for European Patent Application Serial No. EP04011978, 12 pages.
Federal Trade Commission. "False Claims in Spam", A report by the FTC's division of marketing practices, Apr. 30, 2003, http://www.ftc.gov/reports/spam/030429spamreport.pdf.
Hansell. "Internet is losing ground in battle against spam", The New York Times: Technology section, Apr. 22, 2003, 2003.
Written Opinion of the Internarioanl Preliminary Examining Authority mailed Nov. 30, 2005 for PCT/US03/41526, 5 pages.
International Search Report dated Jan. 17, 2006, mailed Jan. 31, 2006, for PCT Application Serial No. PCT/US04/05501, 2 Pages.
Cynthia Dwork, et al., Pricing Via Processing or Combatting Junk Mail, Presented at Crypto '92, 1992, pp. 1-11.
Thorsten Joachims, Text Categorization with Support Vector Machines: Learning with Many Relevant Features, LS-8 Report 23, Nov. 1997, 18 pages.
Daphne Koller, et al., Hierarchically Classifying Doucments Using Very Few Words, in ICML-97: Proceedings of the Fourteenth International Conference on Machine Learning, 1997, 9 pages, San Francisco, California, USA.
Ellen Spertus, Smokey: Automatic Recognition of Hostile Messages, Proceedings of the Conference on Innovative Applications in Artificial Intelligence (IAAI), 1997, 8 pages.
Hinrich Schutze, et al., A Comparison of Classifiers and Document Representations for the Routing Problem, Proceedings of the 18th Annual International ACM SIGIR Conference on Research and Development in Information Retrieval, Jul. 9-13, 1995, pp. 229-237.
Yiming Yang, et al., A Comparative Study on Feature Selection in Text Categorization, Proceedings of the Fourteenth International Conference on Machine Learning, 1997, 9 pages.
Yiming Yang, et al., An Example-Based Mapping Method for Text Categorization and Retrieval, ACM Transactions on Information Systems, Jul. 1994, pp. 252-277, vol. 12, No. 3.
David D. Lewis, et al., A Comparison of Two Learning Algorithms for Text Categorization, Third Annual Symposium on Document Analysis and Information Retrieval, Apr. 11-13, 1994, pp. 81-93.

Mehran Sahami, Learning Limited Dependence Bayesian Classifiers, In KDD-96: Proceedings of the Second International Conference on Knowledge Discovery and Data Mining, 1996, pp. 335-338, Menlo Park, California, USA.
William W. Cohen, Learning Rules that Classify E-Mail, in the Proceedings of the 1996 AAAI Spring Symposium on Machine Learning in Information Access, 1996, 8 pages.
Iwayama Makoto, et al., Hierarchical Bayesian Clustering for Automatic Text Classifiation, Natural Language,1995, pp. 1322-1327.
David D. Lewis, An Evaluation of Phrasal and Clustered Representations on a Text Categorization Task, 15th Annual International SIGIR '92, Denmark 1992, pp. 37-50.
Daphne Koller, et al, Toward Optimal Feature Selection, Machine Learning Proc. of the Thirteenth International Conference, Morgan Kaufmann, 1996, 9 pages.
David Dolan Lewis, Representation and Learning in Information Retrieval, University of Massachusetts, 1992.
Tom Mitchell, Machine Learning, Carnegie Mellon University, Bayesian Learning, Chapter 6, pp. 180-184.
Y. H. Li, et al., Classification of Text Documents, The Computer Journal, vol. 41, No. 8, 1998; pp. 537-546.
Juha Takkinen, et al., CAFE: A Conceptual Model for Managing Information in Electronic Mail, Laboratory for Intelligent Information Systems, Department of Computer and Information Science, Linkoping University, Sweden, Conference on System Sciences, 1998 IEEE.
Jacob Palme, et al., Issues When Designing Filters in Messaging Systems, Computer Communications, 1996, pp. 95-101, Stockholm, Sweden.
Richard B. Segal, et al., SwiftFile: An Intelligent Assistant for Organizing E-Mail, In Proceedings of the Third International Conference on Autonomous Agents, May 1999, 7 pages.
Mehran Sahami, et al., A Bayesian Approach to Filtering Junk E-Mail, AAAI Workshop on Learning for Text Categorization, Jul. 1998, 8 pages, Madison, Wisconsin, USA.
David Madigan, Statistics and The War on Spam, Rutgers University, pp. 1-13, 2003.
Padraig Cunningham, et al., A Case-Based Approach to Spam Filtering that Can Track Concept Drift, In The ICCBR'03 Workshop on Long-Lived CBR Systems, Jun. 2003, 9 pages, Trondheim, Norway.
Mark Rosen, E-mail Classification in the Haystack Framework, Massachusetts Institute of Technology, Feb. 2003, 103 pages.
Thorsten Joachims, Transductive Inference for Text Classification Using Support Vector Machines, In Proceedings of the 16th International Conference on Machine Learning, 1999, pp. 200-209, San Francisco, California, USA.
John Wong, Preventing Spams and Relays, Linux Journal, Dec. 1998, 6 pages, vol. 1998 Issue 56es, Specialized Systems Consultants, Inc.
Meng Weng Wong, SPF Overview, Linux Journal, Apr. 2004, 6 pages, vol. 2004 Issue 120, Specialized Systems Consultants, Inc.
Stop, in the Name of Spam, Communications of the ACM, Nov. 1998, pp. 11-14, vol. 41 No. 11.
Eric Allman, Spam, Spam, Spam, Spam, Spam, the FTC, and Spam, Queue, Sep. 2003, pp. 62-69, vol. 1 Issue 6.
Tom Fawcett, "In vivo" Spam Filtering: A Challenge Problem for KDD, SIGKDD Explorations, Dec. 2003, pp. 140-148, vol. 5 Issue 2.
J.D.M. Rennie. ifile: An Application of Machine Learning to E-Mail Filtering, Proceedings of the KDD-2000 Workshop on Text Mining, Sixth ACM SIGKDD International Conference on Knowledge Discovery and Data Mining, 2000. 6 pages.
S. Argamon, et al., Routing documents according to style, In First International Workshop on Innovative Information Systems, 1998, 8 pages.
K. Mock, An Experimental Framework for Email Categorization and Management, Proceedings of the 24th Annual International ACM SIGIR Conference, 2001, pp. 392-393.
Jose Maria Gomez Hidalgo, Evaluating Cost-Sensitive Unsolicited Bulk Email Categorization, SAC 2002, 2002, pp. 615-620, Madrid, Spain.
A.Z. Broder, et al. Syntactic Clustering of the Web, SRC Technical Note, Digital Corporation, Jul. 25, 1997, 13 pages.
Fabrizio Sebastiani, Machine Learning in Automated Text Categorization, ACM Computing Surveys, 2002, pp. 1-47, vol. 34—Issue 1.

I. Androutsopoulos, et al., Learning to Filter Spam E-mail: A Comparison of a Naive Bayesian and a Memory-based Approach, 4th PKDD's Workshop on Machine Learning and Textual Information Access, 2000, 13 pages.

D. Turner et al., Payment-based Email, 5th International Conference on Software Engineering, Artificial Intelligence, Networking, and Parallel/Distributed Computing, Jun. 2004, 7 pages.

Ion Androutsopoulos, et al., An Experimental Comparison of Naive Bayesian and Keyword-based Anti-spam Filtering with Personal E-mail Messages, Proceedings of the 23rd ACM SIGIR Conference, 2000, pp. 160-167.

Patrick Pantel, et al., SpamCop: A Spam Classification & Organization Program, In Proc. AAAI-1998 Workshop on Learning for Text Categorization, 1998, 8 pages.

Giuseppe Manco, et al., Towards an Adaptive Mail Classifier, In Proc. of Italian Association for Artificial Intelligence Workshop, 2002, 12 pages.

P.Y. Simard, et al., Using Character Recognition and Segmentation to Tell Computer from Humans, International Conference on Document Analysis and Recogntion (ICDAR), IEEE Computer Society, 2000, pp. 418-423.

S. Li et al., Secure Human-Computer Identification against Peeping: A Survey, Microsoft Research, 2003, 53 pages.

D.A. Turner et al., Controlling Spam through Lightweight Currency, In Proc. of the Hawaii International Conference on Computer Sciences, Jan. 2004, 9 pages.

Kevin R. Gee, Using Latent Semantic Indexing to Filter Spam, University of Texas-Arlington, 2003, 5 pages.

European Search report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06 01 2631, 3 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2002, pp. 111-118, Arhus, Denmark.

Lorrie Faith Cranor, et al., Spam!, Communications of the ACM, 1998, pp. 74-83, vol. 41—No. 8.

OA dated Oct. 8, 2008 for U.S. Appl. No. 11/743,466, 43 pages.

OA dated Nov. 28, 2008 for U.S. Appl. No. 10/799,455, 53 pages.

OA dated Nov. 6, 2008 for U.S. Appl. No. 10/799,992, 46 pages.

OA dated Jan. 16, 2009 for U.S. Appl. No. 10/917,077, 34 pages.

Office Action mailed Jun. 16, 2010, in U.S. Appl. No. 11/228,032, 28 pp.

Office Action mailed Jan. 14, 2010, in U.S. Appl. No. 11/228,032, 23 pp.

Office Action mailed Jun. 22, 2009, in U.S. Appl. No. 11/228,032, 23 pp.

Office Action mailed Oct. 28, 2008, in U.S. Appl. No. 11/228,032, 14 pp.

"Client/Server/Messaging Suite for SMB," Trend Micro Inc., 1989-2005, printed from website: http://www.trendmicro.com/en/products/suites/csm-smb-suite/evaluate/overview.htm, 1 page.

"Symantec Brightmail AntiSpam," Symantec Corporation, 1995-2005, printed from website: http://www.enterprisesecurity.symantec.com/products/products.cfm?ProductID=642%20, 2 pages.

Freed et al., "Multipurpose Internet Mail Extensions (MIME) Part Two: Media Types," RFC 2046, IETF, Nov. 1996, Sec. 5.1.4 ("Note"), 38 pp.

Mijatovic, "Mechanisms for Detection and Prevention of Email Spamming," in Peer to Peer and SPAM in the Internet: Report based a Licentiate Seminar on Networking Technology Fall 2003, Raimo Kantola, ed., Networking Laboratory, Department of Electrical and Communications Engineering, Helsinki University of Technology, pp. 135-146.

\* cited by examiner

(MORE) ADVANCED SPAM DETECTION FEATURES

TECHNICAL FIELD

This invention is related to systems and methods for identifying both legitimate (e.g., good mail) and undesired mail, and more particularly for extracting message features particular to spam to facilitate spam prevention.

BACKGROUND OF THE INVENTION

The advent of global communications networks such as the Internet has presented commercial opportunities for reaching vast numbers of potential customers. Electronic messaging, and particularly electronic mail ("email"), is becoming increasingly pervasive as a means for disseminating unwanted advertisements and promotions (also denoted as "spam") to network users.

The Radicati Group, Inc., a consulting and market research firm, estimates that as of August 2002, two billion junk e-mail messages are sent each day—this number is expected to triple every two years. Individuals and entities (e.g., businesses, government agencies) are becoming increasingly inconvenienced and oftentimes offended by junk messages. As such, spam is now or soon will become a major threat to trustworthy computing.

A key technique utilized to thwart spam is employment of filtering systems/methodologies. One proven filtering technique is based upon a machine learning approach—machine learning filters assign to an incoming message a probability that the message is spam. In this approach, features typically are extracted from two classes of example messages (e.g., spam and non-spam messages), and a learning filter is applied to discriminate probabilistically between the two classes. Such conventional learning filters commonly referred to as "content-based filters," typically scan messages for particular dictionary words or phrases that are more characteristic of spam. However, with the onslaught of such spam filtering techniques, many spammers have thought of ways to disguise their identities to avoid and/or bypass spam filters. Thus, conventional content-based and even adaptive filters may become ineffective in recognizing and blocking disguised spam messages.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Spammers often tend to modify their messages in a multitude of ways to get through filters. However, there are characteristics of messages that can be difficult for spammers to avoid. Similarly, there are characteristics of non-spam messages that can be difficult for spammers to duplicate. The subject invention provides a system and method that facilitate identifying disguised spam messages by examining particular portions of the messages. More specifically, the present invention involves processing a message to extract data therefrom to distinguish spam messages from legitimate or good messages. Message processing can involve examining various parts of a message for either spam-like or non-spam-like qualities.

According to an aspect of the invention, the subject line of a message can be examined for the presence of consecutive, equivalent characters, including white-space. The consecutive, equivalent characters or white space in the subject line can be counted and stored for a plurality of messages. Following therefrom, one or more ranges corresponding to a degree of spaminess can be determined. The "counted" messages can then be sorted or bucketed into a particular range based at least in part on their respective individual counts. Hence, messages can be associated by their range or degree of spaminess (e.g., feature) rather than their individual counts. Since spam messages are more likely to have higher counts of consecutive, equivalent characters in at least the subject line, the higher counts or ranges of counts of such characters can be extracted and then employed as one or more features that indicate spam.

Additionally, the subject line can also be examined to detect the presence of blobs as well as to determine a distance between a blob and a non-blob portion of the subject line. A blob is a random sequence of characters, numbers, and/or punctuation that can be included to add uniqueness to a message. Hence, blobs can appear in the subject line of a message following any number of consecutive, repeating characters (e.g., white space). In most cases, the blob may be hidden from the message recipient's view. Furthermore, some spammers write in "hello" or "hi" or any other commonly used subject line phrase to fool conventional spam filters as well as message recipients into accepting and opening their messages. Similar inspections can also be performed with respect to the message body.

According to another aspect of the invention, the subject line as well as the body portion of a message can be examined for the presence of non-alphanumeric characters, and in particular, for a percentage of non-white space and non-numeric characters that are not letters detected in the message. For example, after analyzing any number of known spam and/or known good messages, it may be determined that spam on average includes more than about 5% of non-white space and non-numeric characters (that are not letters) in the first 25% of the body portion of the message. Thus, this pair of percentages can be employed as data or features to facilitate catching and identifying spam messages.

Spammers behave maliciously for the most part and are often found to alter message headers so as to confuse or get through conventional spam filters. One of possible tactic they can utilize is to misrepresent the content-type of the message. For example, the primary and/or the secondary content-type can be altered. A survey of messages can be performed to determine whether more non-spam arrives as a particular content-type such as plain-text, for example. Thus, if more non-spam is observed to arrive as plain-text than spam, this particular fact can be extracted and also used as a feature to distinguish between good messages and spam. Furthermore, the content-type can be case-sensitive to more accurately capture variations in content-type notation provided by message sending applications—including those used by spammers.

Another message header that can be tampered with by spammers is the "Received:" line header. As messages hop from one server to the next on their way to their respective destinations, each server that "touches" the message stamps the current time (e.g., timestamp) of its arrival as well as the server's name and IP address. Because spammers are always trying to masquerade their actual source, they often forge some information in the Received header such as the timestamp information. In fact, many times during the forgery process, timestamps are altered or forced and no longer represent an accurate gauge of the time the message originated and consequently, the amount of time it took to deliver the message to the recipient. Thus, analyzing a time-based delta between the timestamp in the first Received header (e.g., first server to accept the message and begin delivery to the next hop) and the "Date:" header (when the message was actually received for delivery to the recipient), normalized to coordinated universal time (UTC), can represent the apparent end-to-end delivery time for the message. For example, most good messages can be or are delivered in less than an hour; whereas, most spam can appear to have taken several hours or even days to reach their destinations.

The extracted data as described herein, or at least a portion thereof, can be used to generate features or feature sets for machine learning systems. Machine learning techniques examine the contents of messages to determine if the messages are spam. The filters can be updated as the feature sets employed in the machine learning learn new characteristics regarding spam and/or non-spam messages.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
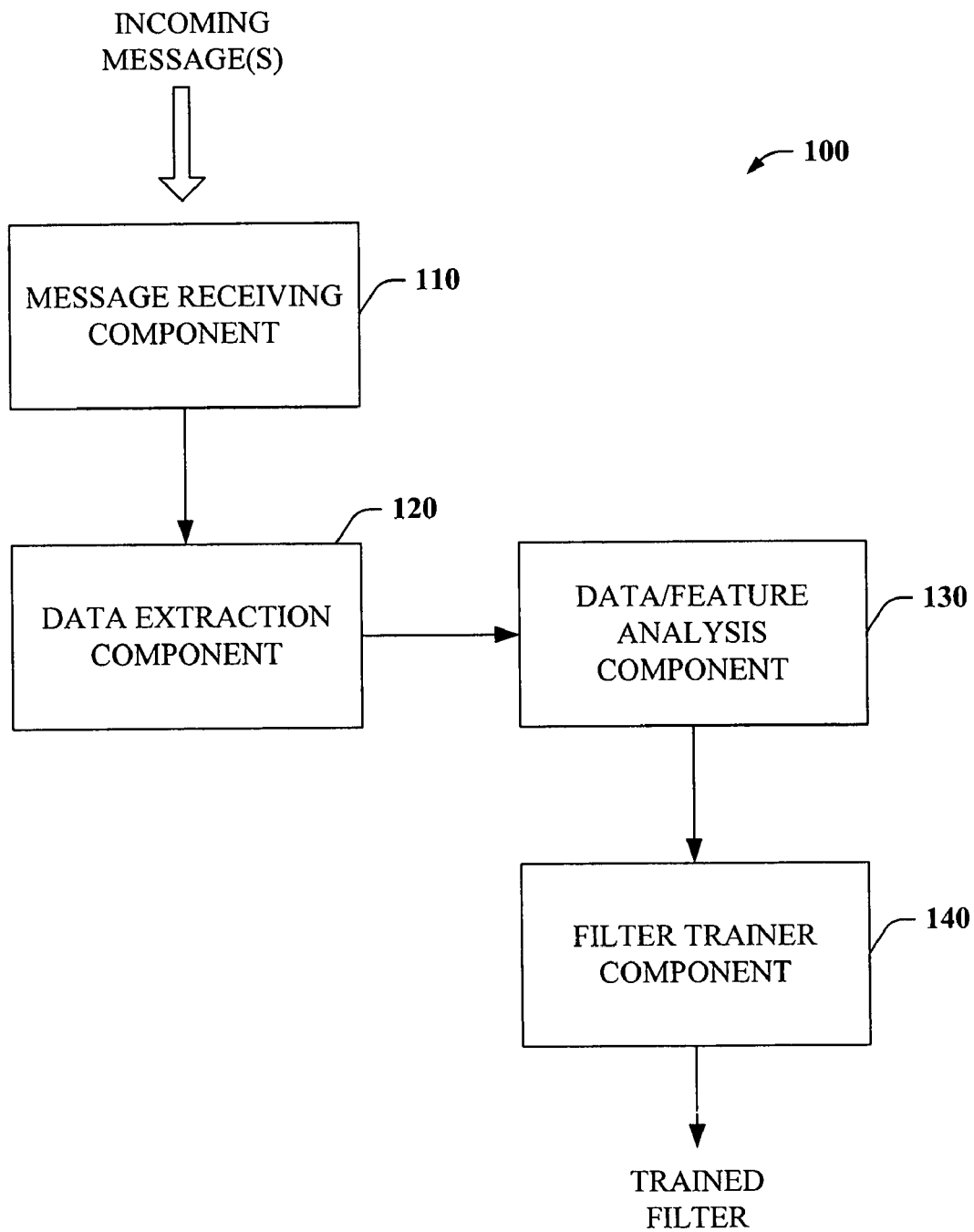
FIG. 1 is a high-level block diagram of a system that facilitates spam prevention in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with generating training data for machine learned spam filtering. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is to be appreciated that although the term message is employed extensively throughout the specification, such term is not limited to electronic mail per se, but can be suitably adapted to include electronic messaging of any form that can be distributed over any suitable communication architecture. For example, conferencing applications that facilitate a conference between two or more people (e.g., interactive chat programs, and instant messaging programs) can also utilize the filtering benefits disclosed herein, since unwanted text can be electronically interspersed into normal chat messages as users exchange messages and/or inserted as a lead-off message, a closing message, or all of the above. In this particular application, a filter can be trained to automatically filter particular message content (text and images) in order to capture and tag as spam the undesirable content (e.g., commercials, promotions, or advertisements).

In the subject invention, the term "recipient" refers to an addressee of an incoming message or mail item. The term "user" can refer to a recipient or a sender, depending on the context. For example, a user can refer to an email user who sends spam and/or a user can refer to an email recipient who receives the spam, depending on the context and application of the term.

Referring now to FIG. 1, there is illustrated a general block diagram of a data extraction and feature generation system 100 for use in training filters in accordance with an aspect of the present invention. The system 100 involves processing incoming messages to extract data or features from the messages. Such data or features can be extracted from at least a portion of the message content or body as well as any header information included with the message. In particular, one or more incoming messages can be received by the system 100 via a message receiving component 110. The message receiving component 110 can be located on an email or message server, for example. Though some messages (e.g., at least one) can succumb to an existing filter (e.g., spam filter, junk filter, parental control filter), and thus be diverted to a trash bin or other type of junk mail folder, at least a portion of the message headers and/or message content can be extracted and analyzed for use in connection with a machine learning system.

The message receiving component 110 can pass the incoming messages, or a subset thereof, to a data extraction component 120. The data extraction component 120 can extract particular types of data from the respective messages 110 in order to generate feature sets to facilitate filter training and ultimately spam detection. Exemplary types of data extracted from the messages for examination include timestamp header information, content-type header information, subject line content, and/or message content including the presence or absence of attachments. The data extraction component 120 can perform any suitable number of processes to extract various sets or subsets of information from the message 110 and to create features therefrom for subsequent training of one or more spam filters.

According to an aspect of the subject invention, the data extraction component 120 can focus on a subject line of a message. The subject line can be analyzed by a data-feature analysis component 130 for the presence of blobs and/or consecutive, repeating characters including letters, numbers, spaces, and punctuation. Consecutive repeating characters, such as in the form of white-space characters, may be observed in connection with or preceding a blob, for instance. Recall that a blob is a set of random characters (e.g., letters, numbers, and/or punctuation) often set out of view in many email clients.

In one aspect of the invention, the data-feature analysis component 130 can count the number of consecutive, repeating characters if any are present. After a number of counts are collected from a plurality of messages, the highest number (e.g., 20 consecutive white-space characters) of consecutive, repeating characters can be determined. From this information, a number of ranges can be established. The set of ranges of consecutive, repeating characters can be determined based on a degree of spaminess to facilitate bucketing current, stored and/or subsequent messages. For example, the ranges for bucketing can be on the order of 0-4, 5-6, 7-8, and 9-14 such that as the range increases, the degree or level of spaminess of the message increases as well. Thus, a message having 0-4 consecutive, repeating characters in the subject line is probably a good or legitimate message whereas a message having 9-14 consecutive, repeating characters in its subject line is probably a spam message. Hence, employing ranges of consecutive, repeating characters as a particular feature optimizes the ability of a machine learning system to differentiate spam from good messages particularly when training filters.

As mentioned above, spam messages can include subject lines engineered to contain a blob for the purpose of uniqueness and may often space a non-blob portion (e.g., normal or logical sequence of characters) of the subject line far from the blob. This can effectively push the blob outside of the visible space in many email clients, for instance (FIG. 4, infra, provides more detailed information regarding this). Hence, the distance, for example in terms of characters or white space, between a blob and a non-blob portion can be determined as well and used a feature.

In addition to the subject line, the data-feature analysis component 130 can also analyze a body portion of a message to detect a string of random characters. In practice, blobs observed in an earlier part of the message can be indicative of spam. However, other portions of the message body may include blobs. Hence, a percentage of non-white space and non-numeric characters can be calculated to facilitate determining whether the message is more spam-like. This percentage determined for a specified portion of the message can indicate a higher degree of spaminess. For example, messages having >10% of non-white space and non-numeric characters (not letters) in the first 30% of the body can be a feature used to train one or more filters.

In another aspect of the invention, the data-feature analysis component 130 can also look at content-type as well as timestamp headers. Information included in such fields can facilitate predicting whether a message is probably spam or probably good. The presence of attachments can also be used as a feature by the machine learning system since attachments are more often found with respect to good messages. Thus, an indication that an attachment is present as well as the type of attachment can be one attribute that makes a message appear to be more legitimate than spam.

The data-feature analysis component 130 can also monitor and/or observe primary and/or secondary (MIME) content-types of messages to determine the content-types characteristic of good messages and spam. Spammers may attempt to forge or misrepresent the content-types of their messages by making them appear to reflect a type more characteristic of good messages (e.g., including messages from trusted senders). Thus, monitoring the content-types identified in incoming messages can facilitate detecting and identifying spam. Furthermore, content-type features can be case-sensitive to more accurately capture variations of primary and/or secondary MIME content-types employed by various email sending applications, for example.

In addition, the data-feature analysis component 130 can examine a first and a last timestamp provided in the Received and Date headers, respectively, of a message to determine a time-based delta between the origination of a message and the receipt of the message to its final destination. For instance, messages which have a time-based delta of less than one hour or even less than six hours are probably legitimate than messages having a time-based delta of just under or more than 24 hours. As more time elapses between the origination (e.g., the time first server accepts message and begins delivery to the next hop or server) and receipt of a message (e.g., message reaches final destination), the level of spaminess of a message increases. This is because spammers have a tendency to use and send the same message again and again, including previous headers. Such previous headers may include forged or old timestamps which persist with the message. As a result of this forgery, spam messages can appear to arrive in a user's inbox before the message was actually sent or appear to take significantly longer to deliver. Such messages are indicative of spam.

Any combination of features as described above can be extracted from each incoming message and then employed to determine whether a message behaves or appears to be more like spam. The presence of any one of the above features or message attributes cannot be determinative of spam but rather examining more than one attribute of a message can facilitate this determination.

Moreover, messages can be randomly, automatically, and/or manually selected to participate in feature extraction, although substantially all messages can be used to train and/or pass through filters. The extracted sets of features are subsequently applied to a filter training component 140 such as machine learning systems or any other system that builds and/or trains filters such as spam filters.

Figure 2:
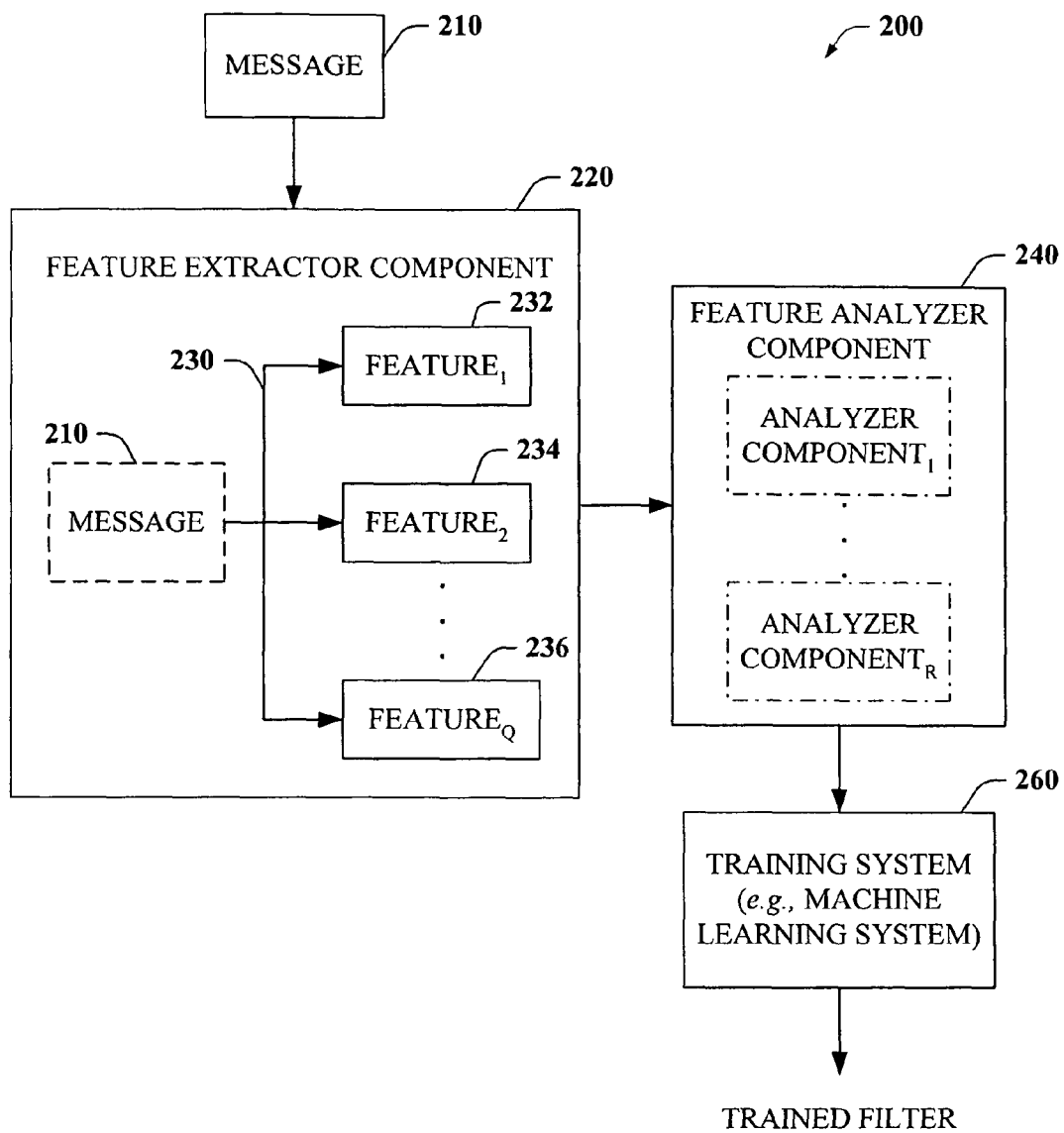
FIG. 2 is a block diagram of a system that facilitates spam prevention by extracting one or more features from incoming messages in accordance with an aspect of the present invention.

Referring now to FIG. 2, there is illustrated a feature extraction system 200 that facilitates normalizing one or more features of an incoming message 210 in accordance with one aspect of the present invention. Ultimately, a filter(s) can be built based at least in part upon one or more of the normalized features. The system 200 comprises a feature extractor component 220 that receives an incoming message 210 either directly as shown or indirectly by way of a message receiving component (e.g., FIG. 1, 110), for example. Incoming messages selected for feature extraction can be subjected to the system 200, according to user preferences. The selection of messages can occur randomly or in the alternative, substantially all incoming messages can be available for and participate in feature extraction.

Feature extraction involves parsing out one or more features 230 (also referred to as $FEATURE_1$, 232, $FEATURE_2$ 234, and $FEATURE_Q$ 236, where Q is an integer greater than or equal to one) associated with some attribute of the message 210. Message attributes can relate to information included in the message headers such as a timestamp indicating when the sender originally sent the message (e.g., first timestamp) and when the message reached its final destination (e.g., last time stamp) and/or a content-type of the message (e.g., primary MIME and/or secondary MIME type). Other message attributes can include such information corresponding to some content in the message body. In some cases, a lack of information such as the absence of an attachment in the message can be an attribute that can be extracted from the message and utilized as a feature.

Because spammers tend to frequently disguise their identity to avoid detection by conventional spam filters, attributes or other information or data extracted from messages can be normalized at least in part by a feature analyzer component 240. The feature analyzer component 240 can include one or more sub-analysis components 242 and 244, respectively, designed to examine and/or normalize the relevant information into at least one feature.

For example, the feature analyzer component 240 can calculate a time-based delta by extracting a first timestamp (e.g., from Received header) and a last timestamp (e.g., from Date header), normalizing them to UTC time codes, then subtracting the timestamps to obtain an apparent end-to-end delivery time for the message. The delivery times can be categorized or bucketed into ranges such as <1 hour, <6 hours, <24 hours, and/or >24 hours, and the messages can be placed in their appropriate bucket or category. Thus, a message having a feature of <1 hour or <24 hours can be an indicator of whether the message is spam. In practice, most legitimate messages will appear to have been delivered in <1 hour. Some spam messages may likely appear in the <1 category as well; however a large majority of spam that includes forged Received headers may likely fall outside of this bucket, making those buckets or ranges of delivery times useful spam indicators.

The feature analyzer component 240 can also compute a percentage of a message body to analyze. For instance, analyzing the beginning portion of the message such as the first 25% of the total lines included within the body part of the message can be performed. Concentrating on particular portions of a message can be useful or important since spammers tend to exhibit different types of behavior in different parts of their messages to fool both recipients and spam filters. For example, a spam message can look like a good message in the beginning and even in the middle portions of the body because it purposefully includes text or words that have been deemed "good". However, at the end of the message, it may include wording, punctuation and/or other text that constitutes spam.

Once a portion of the message has been determined to undergo closer scrutiny, the content therein can be further analyzed. For example, the presence of non-white-space and non-numeric characters that are not letters can be identified and quantified in terms of a percentage. The fact that these kinds of character patterns have been identified can be used as one feature and the percentage of their occurrence can be used as another feature. The subject line of a message can also undergo this type of analysis to determine the occurrence of and the extent to which such character patterns exist therein. Such information about the message can be converted to one or more features, depending on the type of information extracted.

Once the features are normalized, at least a subset of them can be employed by a training system 250 such as a machine learning system, to build and/or update a filter(s). The filter(s) can be trained for use as a spam filter and/or a junk-mail filter, for example. Furthermore, the filter(s) can be built and/or trained with positive features such as those which indicate a non-spam source and/or a non-spam sender as well as with negative features such as those that identify and are associated with a spammer.

Figure 3:
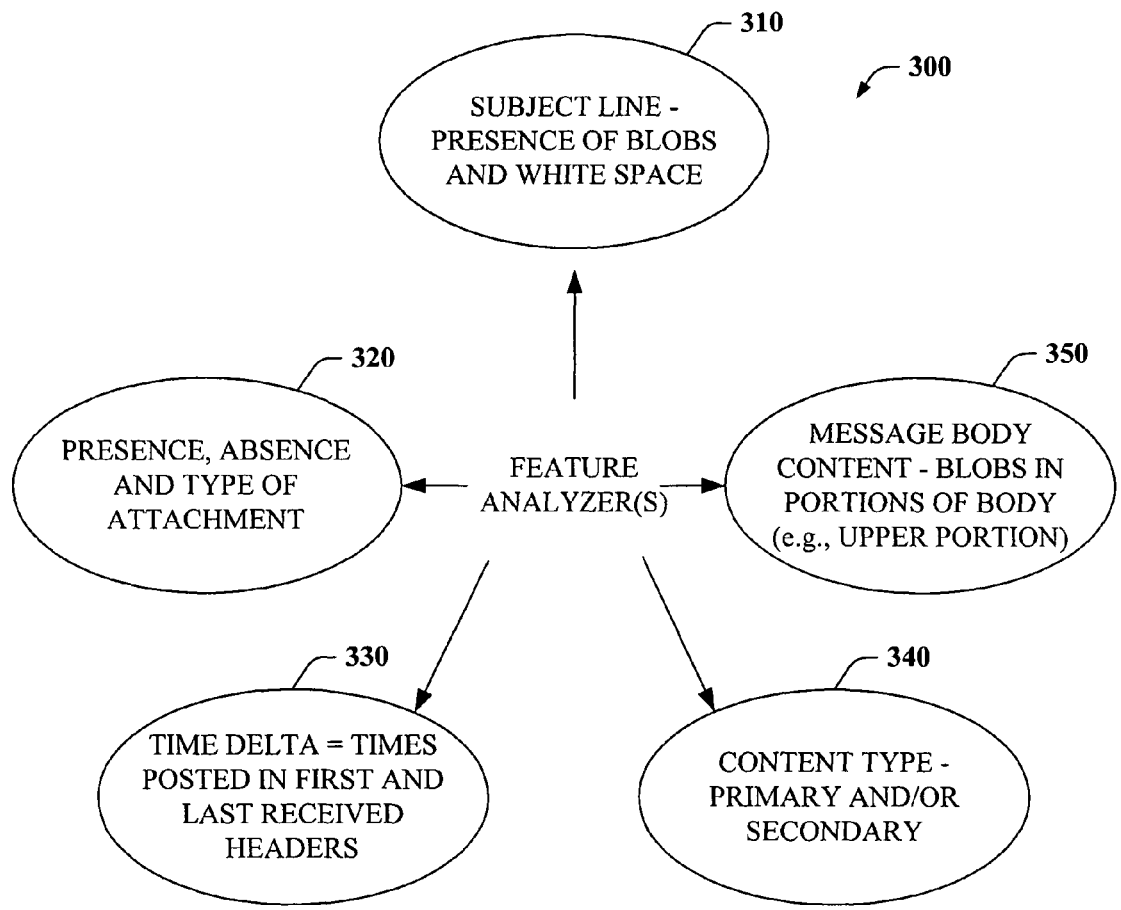
FIG. 3 is a schematic diagram of a plurality of features of a message which can be analyzed in accordance with an aspect of the present invention.

FIG. 3 depicts an exemplary breakdown of a feature analysis component 300 (denoted as feature analyzer) with respect to the types of information that can be extracted and examined and then employed as features for filter training or hand rule building purposes. In one instance, information included on a subject line 310 can be extracted and analyzed in order to generate one or more features therefrom. In particular, the presence of blobs and/or consecutive, repeating characters such as white-space in the subject line can be utilized to decipher between spam and good messages, as described, supra, in FIGS. 1 and 2.

Figure 4:
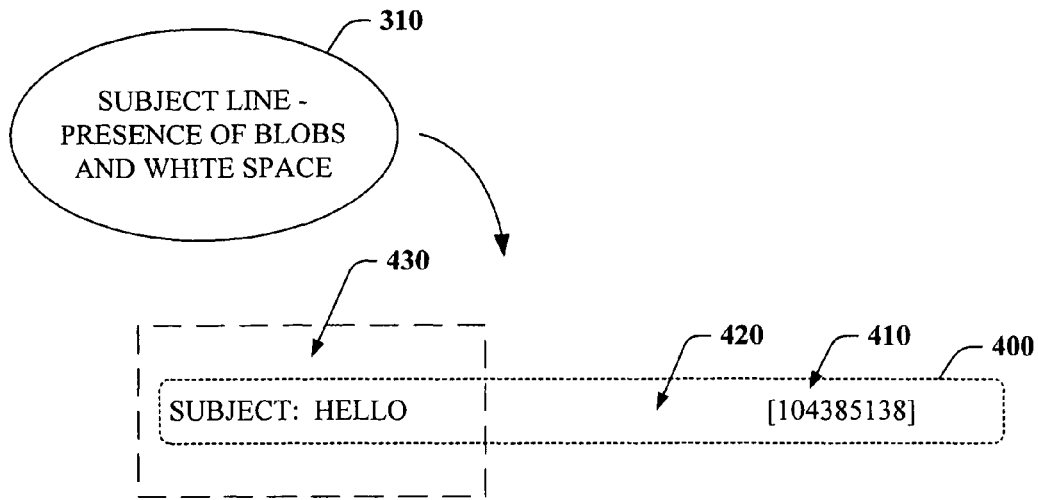
FIG. 4 is a schematic diagram that provides an example of an aspect of FIG. 3 in accordance with an aspect of the present invention.

Turning briefly to FIG. 4, an exemplary subject line 400 is depicted as including a blob 410 spaced relatively far away from a non-blob portion 430. For example, there may be about 20 consecutive, repeating characters in the form of white-space characters between the non-blob 430 and blob 410 portions that effectively push the blob 410 outside the viewable region (for most messaging clients). Thus, only the non-blob portion 430 is viewable to the user and thus, the message appears to be legitimate based on the non-blob portion 430. Spammers thrive on this type of deception.

Further analysis of the consecutive characters 420, such as finding the maximum number of consecutive repeating characters, grouping the possible counts into ranges, and then "bucketing" the possible results, can further generalize and/or optimize the resulting effect that each feature has on a machine learning system. In other words, bucketing or employing ranges for particular features (as opposed to using individual counts: 1, 2, 4, 6 . . . 13) can optimize the results generated from machine learning systems, thereby improving spam detection and prevention.

Referring again to FIG. 3, the feature analyzer 300 can also be programmed to detect any files attached to a message (e.g., attachments 320) as well as to identify the attachment type. The presence or absence of attachments as well as the type of attachments in a message can be useful since most spammers do not include attachments in their messages. This is because attachments can add to the cost associated with sending spam. Therefore, messages including attachments are more likely non-spam. However, messages that do include an attachment may resemble spam depending on the type of the attachment. For example, virus-type spam messages can include attachments in the form of executable files.

In general, most messages are transmitted via SMTP servers from origin to destination. In most cases, messages will transmit quickly between servers. These hops between servers are each indicated in a delivered message by Received: line headers. The Received: line header is stamped on the message at each hop by the SMTP server. The stamp can also include information concerning where the message came from (e.g., IP address, server name) as well as the current time or timestamp. To combat forgery or other acts intended to masquerade the spammer's identity as well as the message, the delivery time of a message can be computed and used as a feature. Longer (computed) delivery times suggest spam whereas shorter delivery times indicate a legitimate message.

For example, imagine that a user has opened all messages (received) dated two days ago as well as all other messages received since then. However, today, the user sees a new message in his inbox that appears to have arrived two days ago. This can occur when spammers force or leave in some timestamp that persists in every copy of the message they send regardless of when they send it. As a result, the message appears to have come from a time that it did not, and most of these types of messages can be determined to be spam by determining the delivery time.

Delivery times can be determined by computing a time-based delta 330. The time-based delta 330 can be calculated by taking the difference between the timestamps in the first Received header and in the Date header, and then normalizing them to UTC time codes. If a computed delivery time is >24 hours, then the message is almost always spam and can be classified as such. However, delivery times of less than a few hours or even less than 12 hours are probably non-spam.

Overall, message headers are prone to spammer modification in their attempts to mimic or resemble as many qualities of good messages as possible. Another spammer technique involves misrepresenting the primary or secondary content-type 340 of the message. The content-type header describes the data contained in the message body to a sufficient extent that the receiving user agent can choose an appropriate mechanism to present the date to the user or to otherwise deal with the data. Information in the content-type header can include at least a type and subtype identifier followed by a set of parameters which correspond to the type and subtype. There are seven standard predefined content-types: text, multipart, message, image, audio, video, and application.

As messages arrive at a message receiving component (e.g., FIG. 1, 110), information can be parsed from the message including the content-type. After the messages are classified as spam or non-spam, their respective content-types can be noted and stored along with the classification. For example, a sampling of messages can demonstrate that most non-spam messages arrive as plain-text (e.g., having a primary MIME type definition of "text/html"). Thus, "text" could be extracted as a primary MIME type feature. Thus, receiving an abnormal surge of text-type messages can indicate that at least some of the messages may be spam and that spammers are mimicking the content-type of good messages. As a result, the text-type feature can be down-weighted when evaluating the message and its features overall to determine if it is spam or more likely to be spam.

It should be appreciated that the content-type feature can be case-sensitive, thus a "Text/HTML" type would be different from a "text/html" type. The same analysis and feature extraction can be applied to the secondary MIME-part types. Thus, in the previous examples, "html" and "HTML", respectively, could be used as two separate features to facilitate differentiating spam from non-spam messages.

Figure 5:
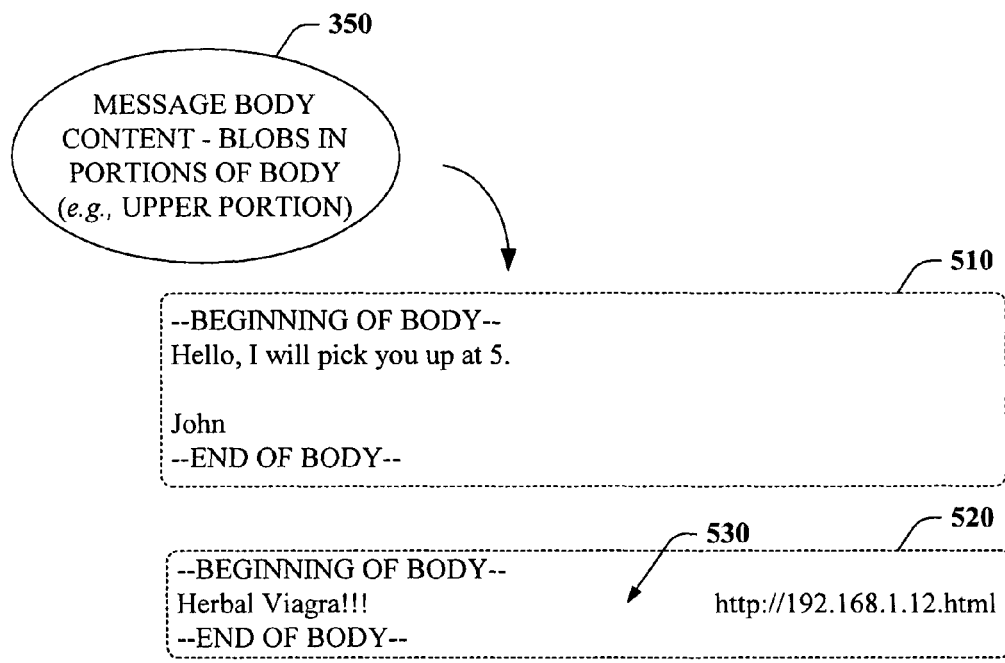
FIG. 5 is a schematic diagram that provides an example of an aspect of FIG. 3 in accordance with an aspect of the present invention.

Most non-spam messages are written in very ordinary form such as non-spam message 510 as illustrated in FIG. 5. As can be seen, the non-spam message 510 does not have variations in spacing and does not include any blobs (e.g., random sequences of characters, numbers, and/or punctuation). Meanwhile, many spam messages do include blobs, variations in spacing, and potentially only URLs in the message bodies, as demonstrated in spam message 520. As shown, the spam message 520 includes consecutive repeating characters such as the three exclamation points as well as the white space 530 between the text portion "Herbal Viagra!!!" and the URL. Thus, a body portion of the message can be observed to detect blobs as well as other spacing and/or character pattern oddities not typical of good messages. For example, a beginning portion such as the first 5 lines can be inspected for the presence of blobs. It should be appreciated that the number of consecutive lines and/or location of consecutive lines selected for closer examination can vary depending on user or system preferences.

The message body can also be analyzed to determine its percentage of non-white-space and non-numeric characters (that are not letters). This percentage can be used as a feature as well because spam usually demonstrates a higher percentage than good messages. More specifically, after analyzing a number of spam and non-spam messages, a user or system may conclude that some threshold value or percentage (e.g., >10%) of a non-spam message comprises non-white-space and non-numeric characters (that are not letters). Therefore, when a calculated percentage exceeds the threshold, that portion of the message body or the entire message body can be further inspected.

Such messages and the information extracted therefrom can be translated into one or more features for detecting spam. Thus, utilizing a threshold value in this manner can facilitate reducing the total number of variations of the features that serve as inputs to the machine learning system. Similarly, an identical feature can be introduced that analyzes this percentage of non-numeric and non-white-space characters within the subject line portion of the message.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
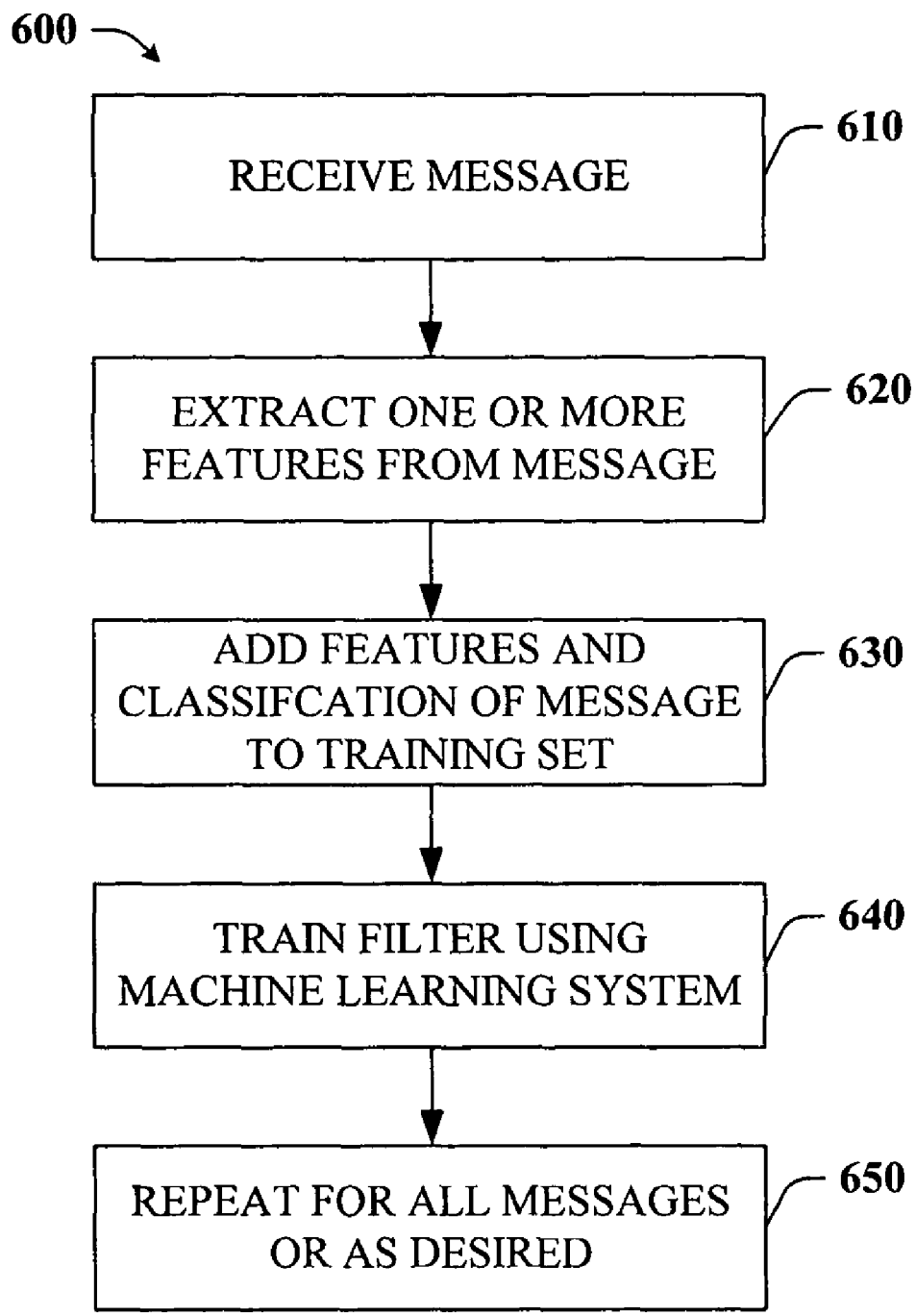
FIG. 6 is a flow diagram of an exemplary method in connection with training filters in accordance with an aspect of the present invention.

Referring now to FIG. 6, there is illustrated a flow diagram of an exemplary process 600 that facilitates training a filter in accordance with an aspect of the present invention. The process 600 can begin with receiving a message (e.g., at least one message) at 610. The message(s) can be received by a server, for example, where optionally an existing filter (e.g., a spam filter) can predict that the message is likely spam or unlikely spam based at least in part upon a set of criteria previously learned by the filter.

At 620, the message can be parsed to extract one or more features or to extract information therefrom that can be later employed to generate one or more features. The particular attributes of the message which can be extracted include subject line information, attachment information, timestamp data, content-type information, message body information, and/or data computed based on information in the subject line and/or the message body (e.g., percentage of non-white-space and non-numeric characters in a particular region of the message—such as, first 5 lines or first 25% of message).

The features generated from the message as well as the classification of the message (e.g., spam or not spam) can be added to a training set of data at 630. The set of training data can be employed to train a filter by way of a machine learning algorithm, for example, at 640. At 650, the process 600 can be repeated for substantially all other incoming messages until the filter is trained accordingly.

Figure 7:
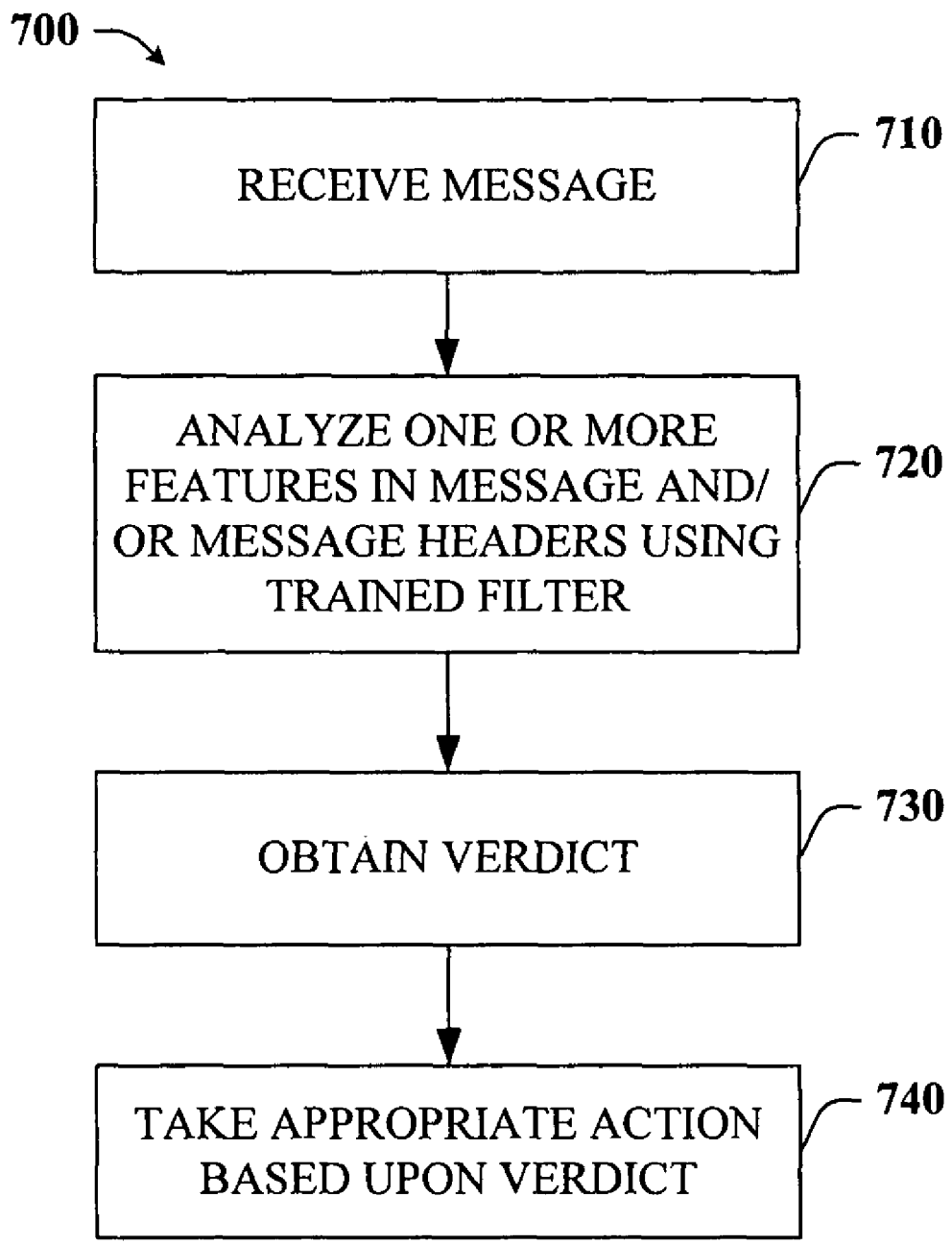
FIG. 7 is a flow diagram of an exemplary method in connection with employing a trained filter in accordance with an aspect of the present invention.

Once trained, a machine learning filter can be utilized to facilitate spam detection as described by an exemplary methodology 700 in FIG. 7. The methodology 700 begins with receiving a message at 710. At 720, one or more features are extracted from the message and analyzed as described, infra. At 730, the extracted features associated with the message (or the message and features) are passed through a filter trained by a machine learning system, for instance. Following, a verdict such as "spam", "not spam", or a probability of the message being spam is obtained from the machine learning system. Once the verdict is obtained regarding the content of the message, appropriate action can be taken. Types of actions include, but are not limited to deleting the message, moving the message to a special folder, quarantining the message, and allowing the recipient to view or access the message (e.g., to rescue the message).

Figure 8:
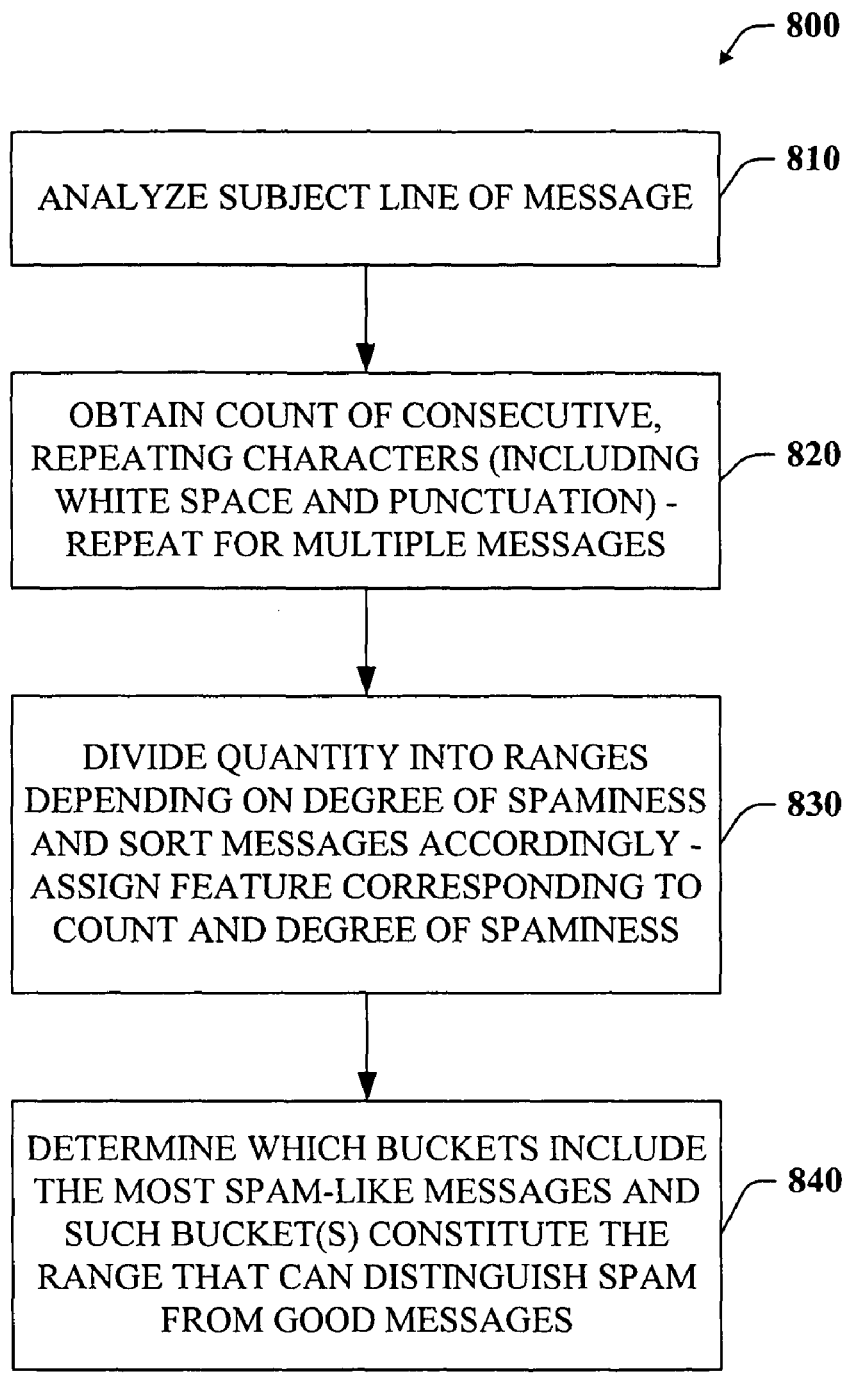
FIG. 8 is a flow diagram of an exemplary method in connection with analyzing a subject line of a message to extract one or more features therefrom in accordance with an aspect of the present invention.

Referring now to FIG. 8, there is a flow diagram of an exemplary method 800 that involves analyzing specific attributes of a message to facilitate spam detection and prevention. In particular, the method 800 involves extracting and/or analyzing information from a subject line of a message at 810. At 820, a count of any consecutive, repeating characters detected in the subject line can be obtained. Characters include spaces or white-space as well as letters, numbers and punctuation. This information can be stored and counts can be obtained for a plurality of other messages.

Based on the highest or near highest count obtained from the plurality of messages, a distribution of ranges can be established based on a degree of spaminess at 830. For example, imagine the following ranges: 0-4, 5-7, 8-9, and/or 10-14 consecutive repeating characters. Messages having 1 observed consecutive repeating character can be bucketed or assigned to the 0-4 group. Messages having 6 consecutive repeating characters can be assigned to the 5-7 bucket, etc. Each bucket or grouping can correlate to a degree or level of spaminess; and the assigned grouping can be translated into a feature. Other features can be extracted as well. For instance, the individual count per message can be used as a feature.

At 840, the groupings can be further analyzed to determine degrees of spaminess such as the following: messages in 0-4 bucket are most likely good messages; messages in the 8-9 bucket are more spam-like and the messages in the 10-14 bucket are most likely spam. Moreover, features generated from examining the subject line in this manner can be useful indicators of spam and non-spam messages.

Figure 9:
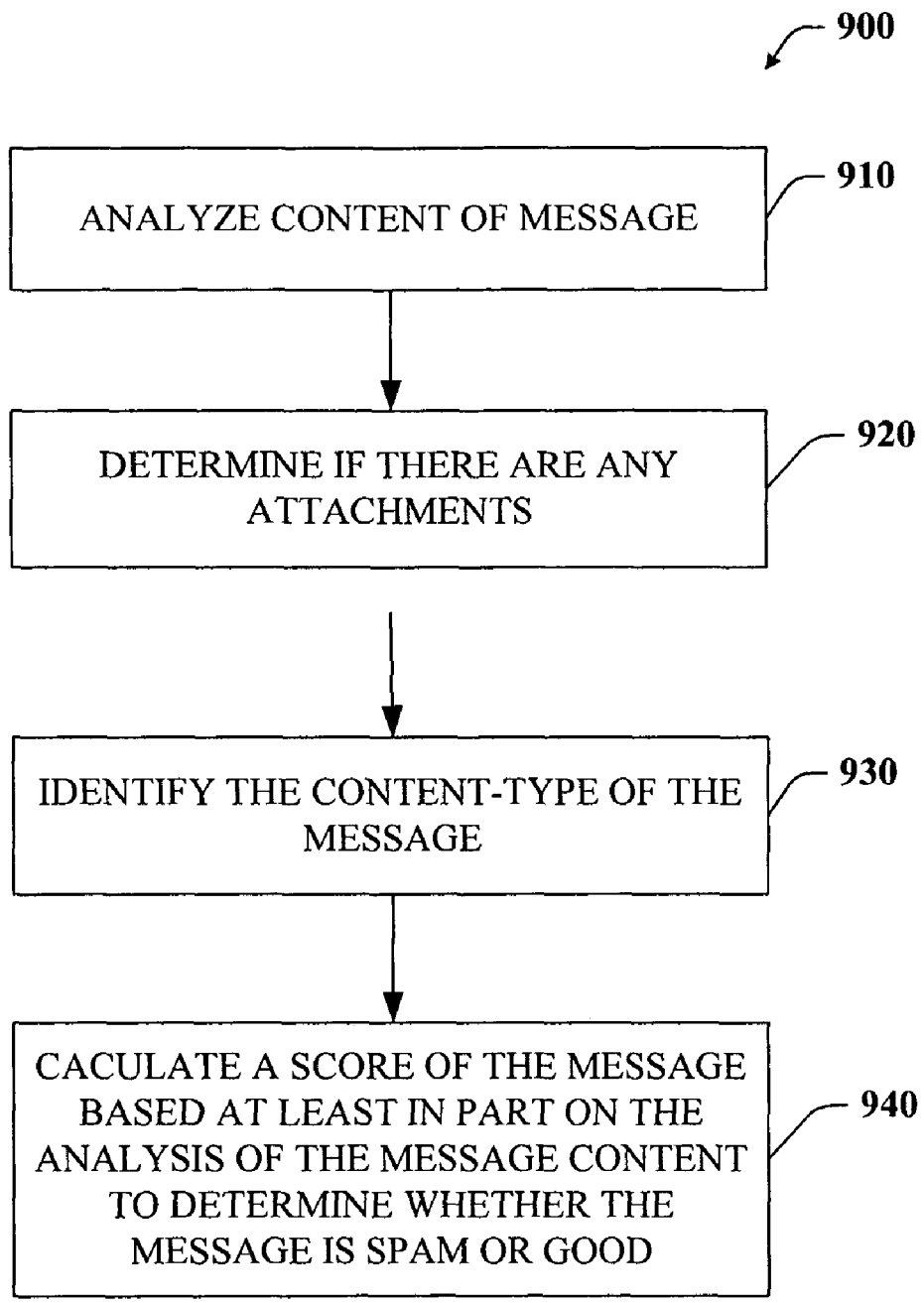
FIG. 9 is a flow diagram of an exemplary method in connection with analyzing message content to extract one or more features therefrom in accordance with an aspect of the present invention.

Turning now to FIG. 9, there is a flow diagram of an exemplary method 900 that facilitates identifying spam-like characteristics and detecting spam in accordance with an aspect of the present invention. The method 900 involves extracting at least a portion of information associated with the content of the message or message body for analysis at 910. At 920, the presence of any attachments can be determined. This can be helpful in differentiating spam from non-spam because most spam messages do not include attachments due to the higher costs associated therewith. Thus, the presence of an attachment can be a positive feature to indicate that a message is not spam. However, if an attachment is detected, the type of attachment can be extracted as certain document or file types are more prevalent in spam than others.

At 930, the primary and/or secondary MIME content-type can be identified. This can be useful since many spammers try to mimic qualities of good messages. For example, if most good messages arrived as multipart-type, then spammers may try to masquerade their messages as multipart-type messages. The converse may apply as well. When the method observes a high influx of multipart-type messages compared to previous days (or at the similar time of day), it can cause such messages to undergo further scrutiny, thereby resulting in possibly catching some spam that may have otherwise gotten passed the filter. The content-type feature can also be case-sensitive to accommodate or account for the different variations of content-types used by different messaging applications.

Upon consideration of the various attributes extracted from the message and analyzed, the messages can be given an overall score such as a spam probability score to indicate whether the message is more or less likely to be spam (at 940). The score can be compared to a spam threshold value whereby scores meeting or exceeding the threshold value are deemed spam and scores below are deemed good or questionable at best. Questionable messages (e.g., messages close to the threshold value) can be handled in any manner as desired by the user or system.

Figure 10:
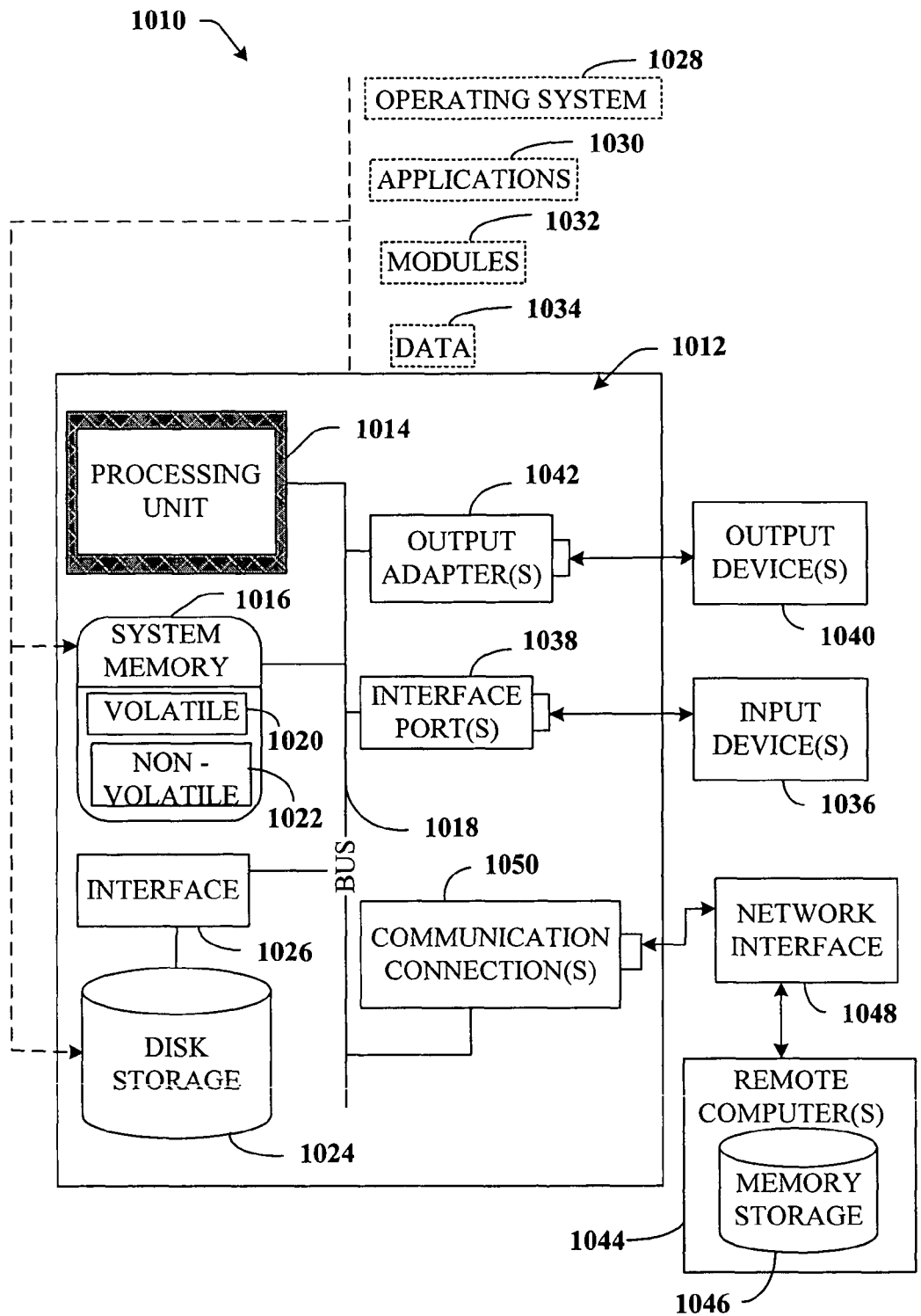
FIG. 10 is an exemplary environment for implementing various aspects of the invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018.

The system bus 1018 couples the system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory; 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates extracting data in connection with spam processing, comprising:
  a processing unit; and a memory for storing computer-executable instructions that when executed by the processing unit executes:

a component comprising software that receives a message and extracts a set of features associated with some part, content or content type of a message; and an analysis component comprising software that examines (1) consecutiveness of characters within a subject line of the message, wherein the analysis component establishes ranges of consecutive, repeating characters, the ranges corresponding to varying degrees of spaminess, whereby messages can be sorted by their respective individual count of consecutive repeating characters and, (2) a content type of the message for spam in connection with building a filter, wherein the content type describes a type of data contained within a body of the message, the content type being case-sensitive and comprising a primary content-type, a secondary-content type, or a combination thereof, the primary content-type and the secondary-content type comprising at least one of a text, a multipart, a message, an image, an audio, a video, or an application, wherein the analysis component compares the content type of the message to stored content types of a plurality of other messages to facilitate determining whether the message is spam.

2. The system of claim 1, the analysis component determines frequency of consecutive repeating characters within the subject line of the message.

3. The system of claim 2, the characters comprise letters, numbers, or punctuation.

4. The system of claim 1, the analysis component determines the frequency of white space characters within the subject line of the message.

5. The system of claim 1, the analysis component determines distance between at least one alpha-numeric character and a blob, wherein the blob comprises a random sequence of characters, numbers, punctuation, or a combination thereof.

6. The system of claim 1, the analysis component determines a maximum number of consecutive, repeating characters and stores this information.

7. The system of claim 1, the analysis component further determines time stamps associated with the message.

8. The system of claim 7, the analysis component determines a delta between time stamps.

9. The system of claim 8, the delta is between a first and a last time stamp.

10. The system of claim 1, the analysis component determines at least one of: a percentage of white space to non-white space in the subject line of the message and a percentage of non-white space and non-numeric characters that are not letters in the subject line of the message.

11. The system of claim 1, the filter being a spam filter.

12. The system of claim 1, the filter being a parental control filter.

13. The system of claim 1, further comprising a machine learning system component that employs at least a subset of extracted features to learn at least one of spam and non-spam.

14. A method for evaluating spam as a function of message content, comprising:

employing a processor executing computer readable instructions stored on a computer readable storage medium to implement the following:

parsing a message to extract a set of features associated with a content type of the message, wherein the content type describes the type of data contained within a body of the message, the content type being case-sensitive and comprising a primary content-type, a secondary content-type, or a combination thereof;

examining the extracted set of features to identify a frequency of consecutiveness of repeating characters within a subject line of the message and to identify a distance of white-space characters between at least one alpha-numeric character and a blob comprising a random sequence of characters, numbers, punctuation, or a combination thereof to classify the message as spam or not spam;

establishing ranges of consecutive, repeating characters, the ranges correspond to various degrees of spaminess, wherein each range comprises a number range of frequencies of the consecutive, repeating characters within the subject line of the message;

employing the ranges to sort the message by the frequency of consecutive repeating characters within the subject line of the message;

comparing the content type of the message to stored content types of a plurality of other messages to facilitate determining whether the message is spam; and processing the message as a function of the classification.

15. The method of claim 14, wherein the repeating characters comprise letters, numbers, punctuation, or white space.

16. One or more computer-readable storage devices having computer-executable instructions embodied thereon that, when executed, perform a method for facilitating extracting data in connection with spam processing, comprising:

receiving a message; determining a particular portion of a body of the message to analyze;

extracting a set of features associated with some part, content or content type of the message;

examining consecutiveness of characters within a subject line of the message and identifying a distance comprising a number of white-space characters between at least one alpha-numeric character and a blob comprising a random sequence of characters, numbers, punctuation, or a combination thereof;

examining a content type of the message for spam in connection with building a filter, wherein the content type describes data contained within the body of the message, the content type being case-sensitive to capture a variation of a primary content-type, a secondary-content type, or a combination thereof, each of the primary content-type and the secondary-content type comprising one of a text, a multipart, a message, an image, an audio, a video, or an application;

comparing the content type of the message to stored content types of a plurality of other messages to facilitate determining whether the message is spam;

determining a percentage of white space to non-white space in the message and a percentage of non-white space and nonnumeric characters that are not letters in the message;

calculating a delivery time for the message using a first timestamp associated with origination of the message and a second timestamp associated with receipt of the message; and categorizing the delivery time into one of a plurality of ranges comprising a range of amounts of time for delivering messages, the ranges corresponding to various degrees of spaminess.

\* \* \* \* \*